US009507951B2

(12) United States Patent
Kang et al.

(10) Patent No.: US 9,507,951 B2
(45) Date of Patent: Nov. 29, 2016

(54) TECHNOLOGIES FOR SECURE INPUT AND DISPLAY OF VIRTUAL TOUCH USER INTERFACES

(71) Applicant: Intel Corporation, Santa Clara, CA (US)

(72) Inventors: Xiaozhu Kang, Fremont, CA (US); Ghayathri V. Garudapuram, Hillsboro, OR (US); Karanvir S. Grewal, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 140 days.

(21) Appl. No.: 14/560,245

(22) Filed: Dec. 4, 2014

(65) Prior Publication Data

US 2016/0110554 A1 Apr. 21, 2016

Related U.S. Application Data

(60) Provisional application No. 62/066,056, filed on Oct. 20, 2014.

(51) Int. Cl.

| | |
|---|---|
| ***G06F 21/60*** | (2013.01) |
| ***G06F 21/84*** | (2013.01) |
| ***G06F 21/83*** | (2013.01) |

(52) U.S. Cl.

CPC ............. *G06F 21/606* (2013.01); *G06F 21/83* (2013.01); *G06F 21/84* (2013.01)

(58) Field of Classification Search

CPC ....... G06F 21/606; G06F 21/84; G06F 21/83

See application file for complete search history.

(56) References Cited

U.S. PATENT DOCUMENTS

| | | | | |
|---|---|---|---|---|
| 2004/0088536 A1* | 5/2004 | Lim | H04L 63/0428 | 713/151 |
| 2004/0215971 A1* | 10/2004 | Nam | G06F 21/83 | 726/22 |
| 2006/0101128 A1* | 5/2006 | Waterson | G06F 21/52 | 709/212 |
| 2008/0148186 A1* | 6/2008 | Krishnamurthy | G06F 21/83 | 715/840 |
| 2009/0265515 A1* | 10/2009 | Kyusojin | G06F 13/28 | 711/154 |
| 2012/0198514 A1* | 8/2012 | McCune | G06F 21/85 | 726/1 |
| 2014/0230067 A1* | 8/2014 | Sahita | G06T 1/60 | 726/26 |
| 2015/0106923 A1* | 4/2015 | Waterson | G06F 21/83 | 726/22 |
| 2015/0121068 A1* | 4/2015 | Lindemann | H04L 63/0823 | 713/158 |

* cited by examiner

*Primary Examiner* — Darren B Schwartz

(74) *Attorney, Agent, or Firm* — Barnes & Thornburg LLP

(57) ABSTRACT

Technologies for secure input and display of a virtual touch user interface include a computing device having a security monitor that may protect memory regions from being accessed by untrusted code. The security monitor may use hardware virtualization features such as extended page tables or directed I/O to protect the memory regions. A protected touch filter driver intercepts requests for touch input and allocates a transfer buffer. The transfer buffer is protected by the security monitor. A touch screen controller may write touch input data into the protected transfer buffer. The touch input data may be shared by the touch filter driver with authorized applications through a protected communication channel. A graphical virtual user interface may be generated by trusted code and rendered into a hardware overlay surface. The user interface may include a virtual keyboard. The security monitor may protect the overlay surface. Other embodiments are described and claimed.

17 Claims, 4 Drawing Sheets

300
A
MONITOR FOR TOUCH REQUEST 314
TOUCH REQUEST? 316
NO
YES
OS DELIVERS TOUCH REQUEST TO DRIVER STACK INCLUDING TRANSFER BUFFER 318
TOUCH FILTER DRIVER REPLACES TRANSFER BUFFER WITH PROTECTED TRANSFER BUFFER 320
TOUCH CONTROLLER WRITES TOUCH INPUT DATA IN PROTECTED TRANSFER BUFFER 322
TOUCH FILTER DRIVER RECEIVES INPUT DATA FROM PROTECTED TRANSFER BUFFER 324
TOUCH FILTER DRIVER PROVIDES TOUCH INPUT DATA TO PROTECTED APPLICATION VIA PROTECTED SIDE CHANNEL 326
TOUCH FILTER DRIVER PROVIDES TOUCH INPUT TO VIRTUAL USER INTERFACE SERVICE 328
USER INTERFACE SERVICE CONVERTS TOUCH INPUT TO USER SELECTION 330
USER INTERFACE SERVICE UPDATES OVERLAY SURFACE FOR USER SELECTION 332

TECHNOLOGIES FOR SECURE INPUT AND DISPLAY OF VIRTUAL TOUCH USER INTERFACES

CROSS-REFERENCE TO RELATED APPLICATION

The present application claims priority under 35 U.S.C. §119(e) to U.S. Provisional Patent Application Ser. No. 62/066,056, entitled "TECHNOLOGIES FOR SECURE INPUT AND DISPLAY OF VIRTUAL TOUCH KEYBOARD," which was filed on Oct. 20, 2014.

BACKGROUND

Many applications executed by touch-screen-based computing devices, such as online financial website logins, may ask the user to enter his or her login information using a virtual touch user interface such as a virtual keyboard or virtual PIN pad. Kernel mode and user mode keyloggers and screen-scraping malware may read those keystrokes and thus steal the user's confidential input. For example, malware may attach a keylogger to read the user's confidential input. As another example, malware may collect a sequence of screen captures of the touch keyboard keystroke highlights using a desktop screen-scraping API or any other method of accessing the display buffers containing the touch keyboard image.

Previous solutions to protect input from the touch user interface have used a secure enclave (such as Intel® SGX technology) to translate touch coordinates received over a secure channel from a converged security and manageability engine (CSME) to a keypad button push. Other solutions have inserted a filter driver in the touch input driver stack to perform side channel communication with the application, without providing any malware resistance or other hardening.

Previous solutions to protect the display output of the touch user interface have cryptographically protected display data using Intel® SGX technology and a protected audio/video path (PAVP). Other solutions have protected display data using a manageability engine (ME) secure sprite (i.e., ME stolen memory and CSE) or by setting up a shared isolated memory region (IMR) protected memory buffer to display the keyboard.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
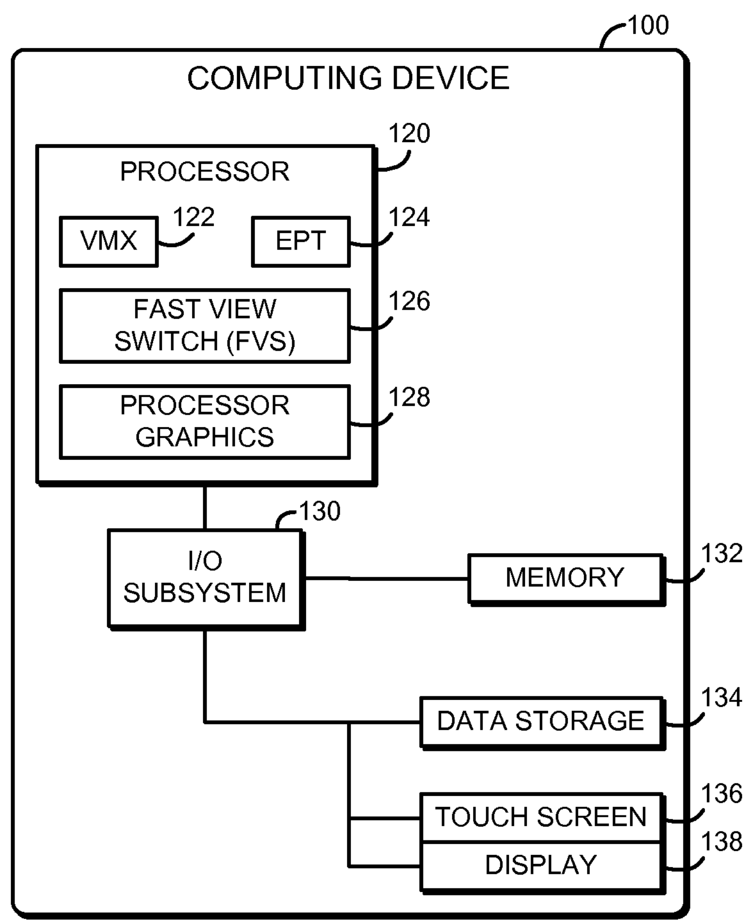
FIG. 1 is a simplified block diagram of at least one embodiment of a computing device for secure input and display of a virtual touch keyboard.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for secure input and display of a virtual touch user interface includes a processor 120, an I/O subsystem 130, a memory 132, a data storage device 134, a touch screen 136, and a display 138. In use, as described below, the computing device 100 is configured to protect the input and display of a virtual touch user interface, such as a virtual keyboard. The processor 120 provides hardware virtualization features that allow security software to execute in a privileged mode beyond the operating system. The processor 120 also supports hardware-assisted memory protection for trusted code using a trusted memory service layer (TMSL). To provide secure input, a protected filter driver is inserted in the touch driver stack. This filter driver replaces an unprotected transfer buffer with a transfer buffer protected with TMSL. The touch screen 136 copies touch input data, such as touch coordinates, directly into the protected transfer buffer using a direct memory access (DMA) operation. The filter drive extracts the touch input data from the protected transfer buffer and transfers the touch coordinates directly to an application via a protected side channel. To provide secure output, a window and an in-memory display overlay surface for the virtual touch user interface are constructed. Once the system loads a virtual user interface service, the virtual user interface is displayed using the overlay surface. The overlay surface containing the graphical user interface image is protected with TMSL.

By using the TMSL hardware-assisted protected memory, the input and display of the virtual touch keyboard may be protected from both user- and kernel-mode malware. Because memory is protected using virtualization features of the processor 120, cryptographic methods may not be needed to protect the data. Because those virtualization features may be found in many processors 120, no additional or modified hardware (e.g., no manageability engine or other security coprocessor is needed, no protected audio-video path is required, and/or no specialized trusted input hardware may be required). Additionally, many screen-scraping or API hooking attacks may be prevented, because such attacks typically do not target a hardware overlay surface (and malware will also not have permission to access the protected overlay surface directly). Additionally, each individual API call may not be hooked or otherwise provide protection from screen-scraping or API hooking attacks.

Although illustrated as providing secure touch input and secure display output for a virtual touch keyboard, it should be understood that the technologies disclosed herein may secure any touch screen input, sensor input, or other input to the computing device 100. For example, the technologies disclosed herein may apply to input from peripheral devices or sensors such as credit card readers or other payment device readers, biometric sensors such as fingerprint readers, cameras, microphones, location devices such as GPS receivers, input devices (e.g., a keyboard or mouse), USB devices, Bluetooth devices, or other peripheral devices.

Additionally, although illustrated as securing virtual keyboard output, the technologies disclosed herein may also secure against screen scraping attacks in general by protecting the memory of an application and the memory buffers used for generating graphical output. For example, the technologies disclosed herein may secure output in a multiprocessor system (e.g., GFX) using protections that are effective across service virtual machines.

The computing device 100 may be embodied as any type of device capable of secure input and display and otherwise performing the functions described herein. For example, the computing device 100 may be embodied as, without limitation, a laptop computer, a notebook computer, a tablet computer, a smartphone, a mobile computing device, a wearable computing device, a computer, a desktop computer, a workstation, a server computer, a distributed computing system, a multiprocessor system, a consumer electronic device, a smart appliance, and/or any other computing device capable of secure input and display. As shown in FIG. 1, the illustrative computing device 100 includes the processor 120, the I/O subsystem 130, the memory 132, and the data storage device 134. Of course, the computing device 100 may include other or additional components, such as those commonly found in a tablet computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. The processor 120 includes hardware-based, hardware-assisted, or hardware-accelerated support for virtualization. In particular, the processor 120 includes virtual machine extensions (VMX) support 122, extended page table (EPT) support 124, and fast view switch (FVS) support 126. The VMX support 122 supports virtualized execution of operating systems by providing two modes of execution: VMX-root mode and VMX non-root mode. The VMX-root mode allows executing software to have broad control of the computing device 100 and its hardware resources. A hypervisor, virtual machine monitor (VMM), security monitor, or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The execution of certain hardware instructions and certain other system events may trigger hardware-assisted transitions to VMX root mode. Those hardware-assisted transitions are known as virtual machine exits, or VMexits. Upon encountering a VMexit, the processor 120 may switch context from the guest OS to the VMM in order to handle the VMexit. The VMX support 122 may be embodied as, for example, Intel® VT-x technology and/or Intel® VT-d technology.

The EPT support 124 supports hardware-assisted second-level page address translation. For nonvirtualized workloads (or when operating in VMX-root mode), the processor 120 may provide hardware-assisted translation between virtual memory addresses (also known as linear addresses) to physical memory addresses. The processor 120 may translate memory addresses using one or more page table structures stored in the memory 132 and managed by a host operating system, hypervisor, or VMM. For virtualized workloads (or when operating in VMX non-root mode), the processor 120 supports hardware-assisted translation between virtual memory addresses (used, for example, by applications executing within a guest OS) to guest-physical memory addresses. A guest OS may maintain one or more page table structures in the memory 132 to manage the translation to guest-physical memory addresses. However, a guest-physical memory address may not correspond to an actual physical memory address within the memory 132. The EPT support 124 provides hardware-assisted translation between guest-physical memory addresses to physical memory addresses. The EPT support 124 may translate memory addresses using one or more extended page table structures stored in the memory 132 and managed by the VMM, hypervisor, security monitor, or host OS. Without the EPT support 124, translation between guest-physical memory addresses and physical memory addresses may require one or more VMexits. In some embodiments, the processor 120 may also support hardware-assisted translation of guest-physical memory addresses to physical addresses and memory access permissions for direct-memory access (DMA) capable I/O devices. The EPT support 124 may be embodied as, for example, Intel® VT-x technology and/or Intel® VT-d technology.

The EPT support 124 also supports associating access permissions with each guest physical page and/or physical page (e.g., read, write, and/or execute permissions). Permissions violations, which may be known as EPT violations, may generate VMexits that allow the host OS, hypervisor, VMM, or security monitor to handle the EPT violation. Additionally or alternatively, in some embodiments, permissions violations may generate a virtualization exception that may be handled by a guest OS.

The FVS support 126 allows the processor 120 to quickly and atomically switch between several memory views without requiring a VMexit to VMX-root mode. A memory view includes the guest-physical page mapping and associated permissions defined by an EPT and thus may correspond one-to-one with an EPT. The FVS support 126 may support switching memory views by changing a pointer within an in-memory virtual machine control structure (VMCS) to point to a different EPT structure. In some embodiments, the FVS support 126 may allow software in VMX non-root mode to select one of several memory views that have been predefined by software executing within the VMX-root mode. Accordingly, the FVS support 126 may allow a guest OS or trusted software component executing within the guest OS to switch between memory views without requiring a potentially expensive context switch to the VMM, hypervisor, security monitor, or host OS. The FVS support 126 may be embodied as a specialized processor instruction such as the VMFUNC instruction supported by certain Intel® processors.

The processor 120 further includes a processor graphics 128. The processor graphics 128 includes graphics and media processing circuitry that may provide accelerated processing and rendering of three-dimensional graphics, two-dimensional graphics, and various video formats. In particular, the processor graphics 128 may provide support for hardware display overlays that directly render content such as video output on the display 138. In some embodiments, the processor graphics 128 may be embodied as or otherwise include a memory-mapped I/O (MMIO) programmed device. In some embodiments, the processor graphics 128 may be included on the same integrated circuit chip as the processor 120 or as a separate integrated circuit chip included in the same physical package as the processor 120. In other embodiments, the processor graphics 128 may be included in the I/O subsystem 130, discussed in more detail below. In still other embodiments, the processor graphics 128 may be included on a separate expansion board communicatively coupled to a motherboard of the computing device 100.

The memory 132 may be embodied as any type of volatile or non-volatile memory or data storage capable of performing the functions described herein. In operation, the memory 132 may store various data and software used during operation of the computing device 100 such operating systems, applications, programs, libraries, and drivers. The memory 132 may be subdivided into fixed-sized segments known as pages. Each page may include, for example, 4096 bytes of data. The memory 132 is communicatively coupled to the processor 120 via the I/O subsystem 130, which may be embodied as circuitry and/or components to facilitate input/output operations with the processor 120, the memory 132, and other components of the computing device 100. For example, the I/O subsystem 130 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 130 may form a portion of a system-on-a-chip (SoC) and be incorporated, along with the processor 120, the memory 132, and other components of the computing device 100, on a single integrated circuit chip. The data storage device 134 may be embodied as any type of device or devices configured for short-term or long-term storage of data such as, for example, memory devices and circuits, memory cards, hard disk drives, solid-state drives, or other data storage devices.

The display 138 of the computing device 100 may be embodied as any type of display capable of displaying digital information such as a liquid crystal display (LCD), a light emitting diode (LED), a plasma display, a cathode ray tube (CRT), or other type of display device. The touch screen 136 may be embodied as any type of touch screen capable of generating input data in response to being touched by the user of the computing device 100. The touch screen 136 may be embodied as a resistive touch screen, a capacitive touch screen, or a camera-based touch screen. The touch screen 136 may include or be coupled to a touch screen controller or other embedded logic capable of using direct memory access (DMA) to write touch coordinates to the memory 132.

Figure 2:
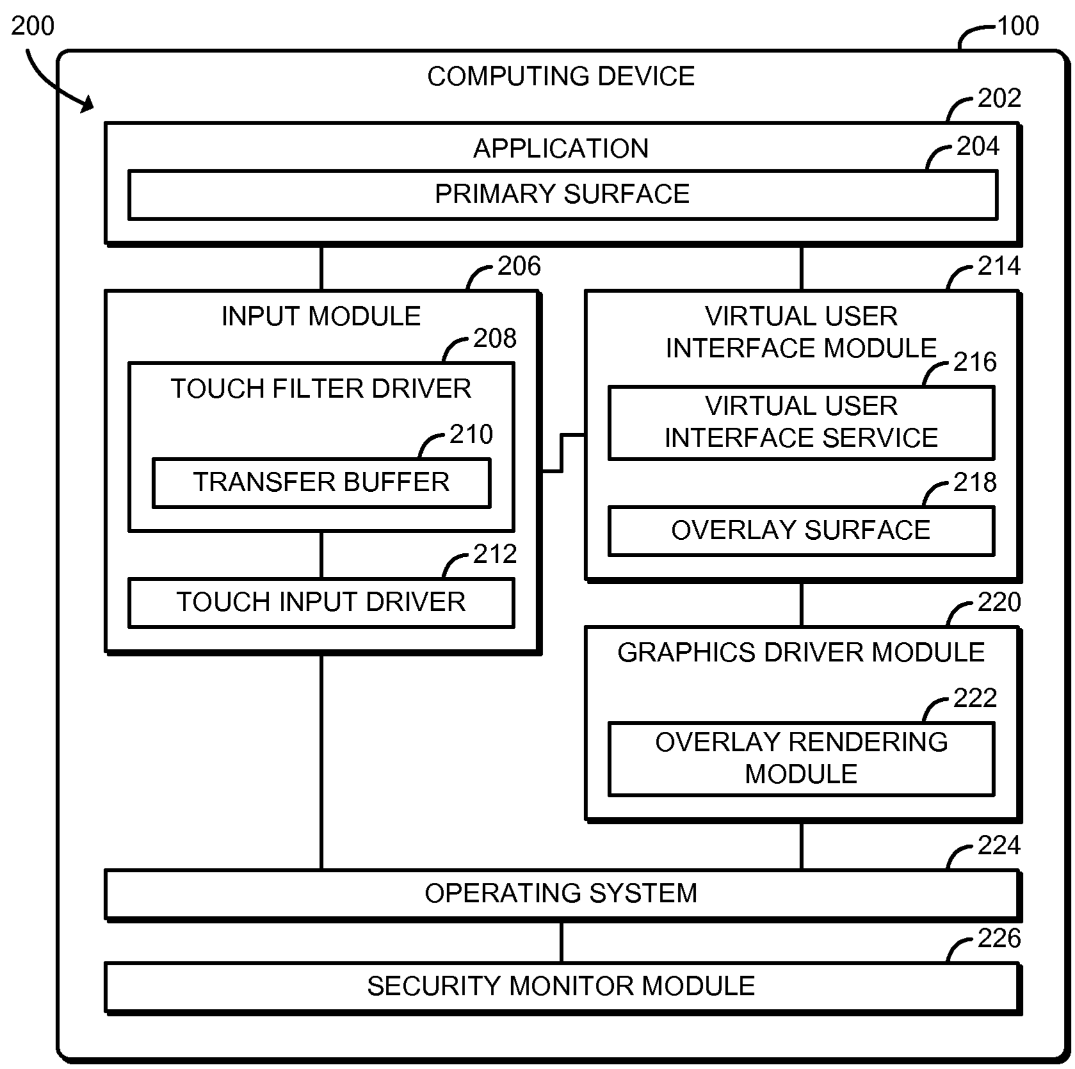
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes an application 202, an input module 206, a virtual user interface module 214, a graphics driver module 220, an operating system 224, and a security monitor module 226. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100. As such, in some embodiments, any one or more of the modules of the environment 200 may be embodied as a circuit or collection of electrical devices (e.g., an input circuit, a virtual user interface circuit, a graphics driver circuit, a security monitor circuit, etc.).

The application 202 may be embodied as any graphical application that interacts with a user using a virtual touch user interface. The application 202 may perform sensitive tasks or access sensitive information such as banking or other financial information. The main window content of the application 202 (e.g., icons, menus, buttons, and other graphical controls) is rendered in a primary surface 204. The primary surface 204 may be embodied as or backed by a surface, bitmap, or other in-memory buffer. The primary surface 204 may not be protected by the security monitor module 226 and thus may be accessible to untrusted software executed by the computing device 100, for example by using a screen-scraping, print screen, or remote access API or other technique to access the memory buffer.

The operating system 224 may be embodied as any operating system, guest operating system, hypervisor, virtual machine monitor, or other control structure of the computing device 100. The operating system 224 may execute in VMX non-root mode, in ring level zero. Thus, the operating system 224 may access the memory 132 through guest physical memory pages and may not have access to extended page tables.

The security monitor module 226 is configured to establish a secure memory view that may only be accessed by trusted components of the computing device 100. The security monitor module 226 may execute in VMX-root mode (similar to a hypervisor or VMM), and may use the EPT support 124 of the processor 120 to establish the secure memory view and prevent access by untrusted code or other untrusted components of the computing device 100. Thus, the security monitory module 226 may operate beyond the control of the operating system 224. For example, the security monitor module 226 may be embodied as a trusted memory service layer (TMSL), and may be implemented using Intel® Virtualization Technology features of certain Intel® processors. Disallowed read/write/execute operations and/or other disallowed memory access from untrusted code in a different memory view (e.g., a default memory view) may trigger a hardware event (e.g., a VMexit) that may be handled by the security monitor module 226, for example by one or more callback functions. The security monitor module 226 may be embodied as or implemented using McAfee memcore, which may be embodied as McAfee DeepSAFE with an API interface for client drivers to connect to it. The security monitor module 226 is configured to protect memory buffers and trusted code modules in the secure memory view using the VMX support 122, the EPT support 124 and/or other hardware virtualization features of the processor 120. For example, the security monitor module 226 may restrict access to the protected memory buffers and trusted code modules.

The input module 206 is configured to store input data such as touch coordinates generated by the touch screen 136 into a protected transfer buffer and transfer the touch coordinates to the application 202 using a protected side channel. The input module 206 may establish or otherwise include an input driver stack including a protected touch filter driver 208 and zero or more additional touch input drivers 212. The protected touch filter driver 208 may be embodied as a driver implemented using a kernel-mode driver framework (KMDF) and may be self-protected using the security monitor module 226 (using TMSL). The protected touch filter driver 208 driver may be installed as a filter driver in the operating system touch input stack. The touch filter driver 208 is configured to intercept requests for touch input and replace an unprotected transfer buffer associated with the request with a protected transfer buffer 210. The touch filter driver 208 may be further configured to transfer the touch coordinates to the virtual user interface module 214 in the secure memory view, for example through a protected data stream. The protected touch filter driver 208, the protected transfer buffer 210, and the side channel to the application 202 are protected by the security monitor module 226.

The virtual user interface module 214 is configured to start a protected virtual user interface service 216. The protected virtual user interface service 216 may be embodied as an operating system service, daemon, application, or other process executed by the computing device 100. The protected virtual user interface service 216 provides support for user interaction using the touch screen 136. For example, the protected virtual user interface service 216 may provide a virtual keyboard, PIN pad, password input field, gestural input field, hand-written signature area, or any other touch input controls for interaction with the user. The protected virtual user interface service 216 may be configured to receive touch input data such as touch coordinates from the input module 206 and to determine a selected virtual input based on the touch input data. The protected virtual user interface service 216 allocates and/or otherwise manages a hardware overlay surface 218. The hardware overlay surface 218 may be embodied as or backed by a surface, bitmap, or other in-memory buffer. In some embodiments, the contents of the hardware overlay surface 218 may be displayed by the processor graphics 128 on the display 138 without requiring additional copying in memory. Additionally, as a hardware overlay, the hardware overlay surface 218 may not be accessible through certain screen-scraping, print screen, and/or remote access APIs. The virtual user interface service 216 and the hardware overlay surface 218 are protected by the security monitor module 226.

The graphics driver module 220 is configured to render graphics and/or video images on the display 138. The graphics driver module 220 may communicate directly with the processor graphics 128 to render graphics and/or video. The overlay rendering module 222 is configured to render the virtual user interface in the overlay surface 218. The overlay rendering module 222 may visually highlight selected inputs of the virtual user interface (e.g., selected virtual keys or buttons) or otherwise provide graphical feedback based on user input. The overlay rendering module 222 may be embodied as a trusted component of the graphics driver module 220, such as a graphics library, miniport driver, or other component. For example, the overlay rendering module 222 may be embodied as or include the DirectX graphics framework. The overlay rendering module 222 is protected by the security monitor module 226.

Figure 3A:
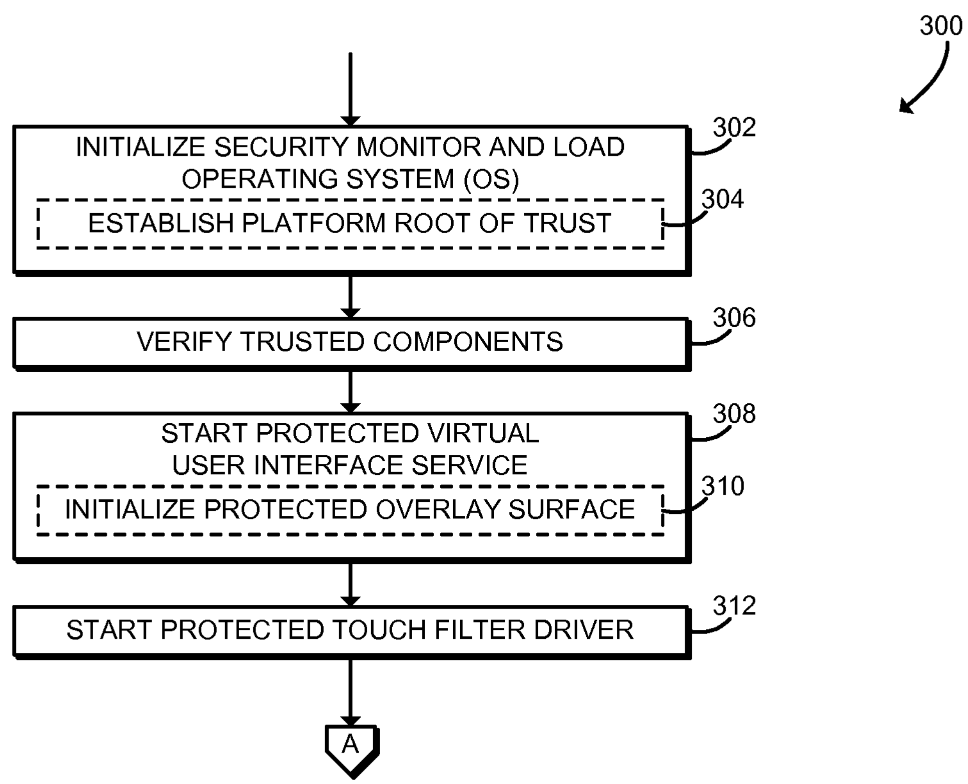
FIGS. 3A and 3B are a simplified flow diagram of at least one embodiment of a method for secure input and display of a virtual touch keyboard that may be executed by the computing device of FIGS. 1 and 2.

Referring now to FIG. 3A, in use, the computing device 100 may execute a method 300 for secure input and display of a virtual user interface. The method 300 begins in block 302, in which the computing device 100 initializes the security monitor module 226 and loads the operating system 224. As described above, the security monitor module 226 may execute in VMX-root mode and thus may be capable of managing memory views and memory permissions. The operating system 224 may execute in VMX non-root mode and thus may be controlled and/or monitored by the security monitor module 226. In some embodiments, in block 304 the computing device 100 may establish a platform root of trust. The platform root of may be embodied as any hardware, firmware, and/or software component of the computing device 100 that may be used to verify that subsequently-loaded components of the computing device 100 have not been altered or otherwise tampered with. For example, the platform root of trust may be embodied as one or more encryption keys preloaded by a manufacturer or other vendor of the computing device 100. In some embodiments, the platform root of trust may be embodied as platform firmware (e.g., platform BIOS), or as a trusted hardware component such as a trusted platform module (TPM).

In block 306, the computing device 100 verifies that one or more trusted components of the computing device 100 have not been altered or otherwise tampered with. The computing device 100 may use any technique for identifying trusted code. For example, the computing device 100 may establish mutual trust through cryptographic bindings and/or through measurements of the various software components involved. In some embodiments, the computing device 100 may verify a component by establishing a chain of trust between the platform root of trust and the component being verified (e.g., firmware/BIOS to VMM to operating system kernel to application). The computing device 100 may verify any application, service, driver, module, or other component of the computing device 100 that attempts to access the secure memory view. For example, the computing device 100 may verify the trusted application 202, the touch filter driver 208, the virtual user interface service 216, and/or the overlay rendering module 222. Verified components may be registered with the security monitor module 226, and the security monitor module 226 may allow verified components to access the secure memory view. If one or more components is not verified, the computing device 100 may perform one or more security operations, such as reporting a potential security violation or denying the unverified component access to the secure memory view.

In block 308, the computing device 100 starts the protected virtual user interface service 216. As described above, the virtual user interface service 216 is protected by the security monitor module 226 and thus may access the secure memory view. Additionally, in some embodiments, memory associated with the virtual user interface service 216 may not be accessed by untrusted components of the computing device 100. The virtual user interface service 216 may be embodied as an operating system service, daemon, library, or other executable component of the computing device 100. In some embodiments, in block 310 the computing device 100 may initialize the hardware overlay surface 218. The overlay surface 218 may be embodied as a video overlay surface, frame buffer, memory-mapped region, or other in-memory graphical data that may be rendered to the display 138 using the processor graphics 128. The overlay surface 218 may be protected by the security monitor module 226, meaning that the overlay surface 218 may be accessible only to trusted components of the computing device 100 using the secure memory view. Thus, the virtual user interface service 216 and/or the overlay rendering module 222 may access the overlay surface 218 to render the virtual user interface to the display 138.

In block 312, the computing device 100 starts the protected touch filter driver 208. As described above, the touch filter driver 208 is protected by the security monitor module 226 and thus may access the secure memory view. Additionally, in some embodiments, memory associated with the touch filter driver 208 may not be accessed by untrusted components of the computing device 100. The protected touch filter driver 208 may be embodied as a kernel-mode device driver, a user-mode device driver, or other executable component of the computing device 100. The protected touch filter driver 208 may be started during the operating system boot process and may continue to run while the computing device 100 is active. The protected touch filter driver 208 may be included with one or more additional touch input drivers 212 in an input stack maintained by the operating system 224. As further described below, the touch filter driver 208 may receive input requests from entities higher in the input stack such as the application 202, the operating system 224, and/or another touch input driver 212. The touch filter driver 208 may pass the input requests to another entity lower in the input stack such as another touch input driver 212 and/or an input device such as a touch screen controller. Similarly, the touch filter driver 208 may receive a response including touch input data from an entity lower in the input stack and pass the response to an entity higher in the input stack. Thus, after starting the protected virtual user interface service 216 and the protected touch filter driver 208, the security monitory module 226 may be configured to protect memory associated with the input memory stream, the touch virtual user interface input stream, and the hardware overlay surface 218. After the protected touch filter driver 208 is started, the method 300 advances to block 314, shown in FIG. 3B.

Figure 3B:
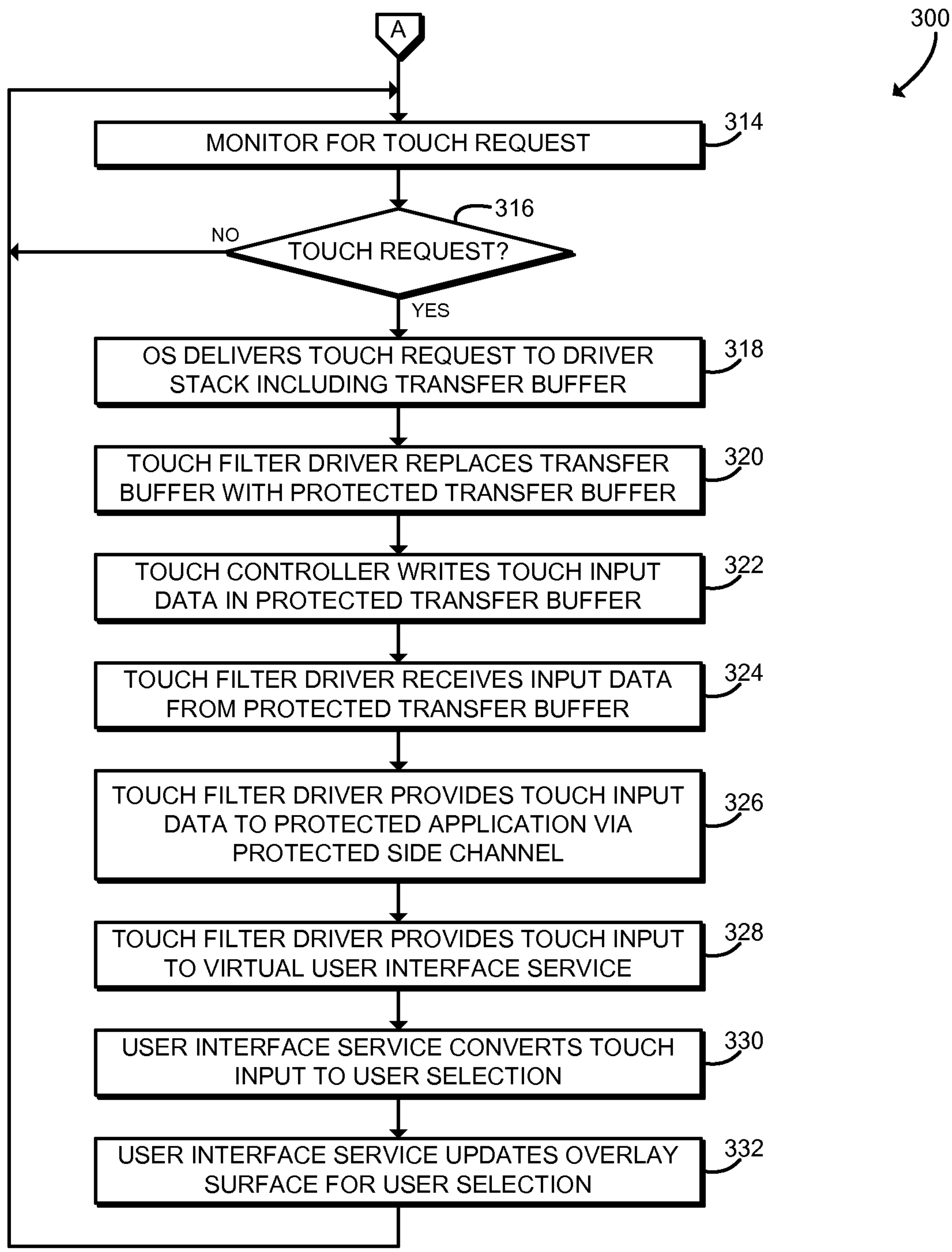

Referring now to FIG. 3B, in block 314 the computing device 100 monitors for a touch request. The touch request may be embodied as any function call, command, or other request to collect touch input data from the touch screen 136. The computing device 100 may monitor for touch requests, for example, in response to a user requesting a virtual keyboard or other virtual user interface while using the application 202. For example, the user may request a virtual keyboard for text input, a virtual PIN pad to complete a financial transaction, a virtual signature area to complete a transaction on a point-of-sale device, a password field to log in to the computing device 100, or any other virtual user interface. The touch request may be generated by the operating system 224, the application 202, a user input framework, and/or any other user input component of the computing device 100. In block 316, the computing device 100 determines whether a touch request has been received. If not, the method loops back to block 314 to continue monitoring for touch requests. If a touch request has been received, the method 300 advances to block 318.

In block 318, the operating system 224 of the computing device 100 delivers the touch request to the touch driver stack. The operating system 224 may deliver the touch request to the protected touch filter driver 208 or to another touch input driver 212 higher in the touch driver stack. The touch request delivered to the touch driver stack may include and/or reference a transfer buffer. For example, an I/O manager of the operating system may allocate a transfer buffer and associate the transfer buffer with the touch request. The transfer buffer may be embodied as an array, buffer, page, or other region of the memory 132. The transfer buffer may not be protected by the security monitor module 226, meaning that untrusted components of the computing device 100 may access the transfer buffer, for example through a default memory view.

In block 320, the touch filter driver 208 of the computing device 100 replaces the transfer buffer of the touch request with a protected transfer buffer 210. The protected transfer buffer 210 may be embodied as an array, buffer, page, or other region of the memory 132 that is protected by the security monitor module 226. For example, the security monitor module 226 may restrict access to the protected transfer buffer 210. The protected transfer buffer 210 may be accessed only by trusted components of the computing device 100 using the secure memory view. After replacing the transfer buffer, the touch filter driver 208 may pass the touch request to a touch input driver 212 lower in the touch driver stack and/or to the touch screen 136 or other input device of the computing device 100. Because the protected transfer buffer 210 is protected by the security monitor module 226, the contents of the protected transfer buffer 210 may not be accessed by untrusted components of the computing device 100 outside of the secure memory view (e.g., by untrusted touch input drivers 212).

In block 322, the touch controller of the touch screen 136 writes touch input data into the protected transfer buffer 210. The touch input data may be embodied as, for example, touch coordinates including x- and y-coordinates corresponding to one or more touch interactions performed by the user on the touch screen 136. The touch controller may perform a direct memory access (DMA) operation to write the touch input data directly to the memory 132. The touch controller may write to the protected transfer buffer 210 using the secure memory view. For example, memory addresses associated with the DMA operation may be translated and permissions may be checked using the VMX support 122 and/or the EPT support 124 of the processor 120. In some embodiments, the touch controller may write the memory 132 using Intel® Virtualization Technology for Directed I/O (Intel® VT-d). Additionally or alternatively, in some embodiments the touch input data may be written to the memory 132 using one or more programmed I/O operations.

In block 324, the touch filter driver 208 of the computing device 100 receives the touch input data from the protected transfer buffer 210. The touch filter driver 208 may receive a response from a touch input driver 212 lower in the input driver stack and/or from the touch screen 136 or other input device of the computing device 100. After receiving the response, the touch filter driver 208 may replace the protected transfer buffer 210 with the original, unprotected transfer buffer received from the operating system 224, described above in connection with the block 318. The touch filter driver 208 may pass the response up the touch input stack, for example to another touch input driver 212, to the application 202, and/or to the operating system 224. In some embodiments, the touch filter driver 208 may pass a response with dummy data (e.g., NULL) up the touch input stack, while providing the real touch input data to the protected application 202 through a protected side channel as described below.

In block 326, the touch filter driver 208 of the computing device 100 provides the touch input data to the protected application 202 via a protected side channel. The side channel may be embodied as any memory buffer, data stream, or other internal communication facility of the computing device 100 that is protected by the security monitor module 226. The side channel may be accessed by the touch filter driver 208 and by the application 202 using the secure memory view. The side channel may not be accessed by untrusted components of the computing device 100 outside of the secure memory view. In some embodiments, the application 202 may process the touch input data, for example by activating one or more buttons, input fields, or other user interactions based on touch coordinates included in the touch input data.

In block 328, the touch filter driver 208 of the computing device 100 provides the touch input data to the virtual user interface service 216. The touch input data may be provided to the virtual user interface service 216 through any memory buffer, data stream, or other internal communication facility of the computing device 100 that is protected by the security monitor module 226.

In block 330, the virtual user interface service 216 of the computing device 100 converts the touch input data to a user selection of a virtual input of the virtual user interface. For example, the computing device 100 may identify a virtual key of a virtual keyboard that includes touch coordinates corresponding to the user's touch input. The computing device 100 may also convert the touch input data into an input character, word, command, or other event associated with the selected virtual input of the virtual user interface. In some embodiments, the virtual user interface service 216 may provide the selected virtual input to the application 202, for example by establishing an in-memory virtual user interface input stream that may be read by the application 202.

In block 332, the virtual user interface service 216 of the computing device 100 updates the overlay surface 218 based on the user selection. The computing device 100 may, for example, visually highlight the selected virtual input associated with the input data (e.g., by changing one or more colors, lines, or other virtual characteristics of the selected virtual input). Thus, the primary surface 204 may not display the virtual touch user interface or otherwise indicate the user's selections. In some embodiments, the virtual user interface service 216 may transmit or otherwise execute one or more drawing commands to the overlay rendering module 222, which may render the virtual user interface in the overlay surface 218. For example, in some embodiments the virtual user interface service 216 may execute one or more DirectX drawing commands, and the overlay rendering module 222 may render the virtual keyboard in the overlay surface 218 based on those DirectX drawing commands. After updating the virtual user interface in the overlay surface 218, the overlay surface 218 and the primary surface 204 are displayed on the display 138. For example, a desktop window manager may composite the overlay surface 218 and the primary surface 204 together and output the combined image to the display 138. In some embodiments, the processor graphics 128 may access and display the overlay surface 218 directly, without requiring the overlay surface 218 to be copied in memory. After updating the virtual user interface, the method 300 loops back to block 314 to continue monitoring for touch requests.

EXAMPLES

Illustrative examples of the technologies disclosed herein are provided below. An embodiment of the technologies may include any one or more, and any combination of, the examples described below.

Example 1 includes a computing device for secure input, the computing device comprising a security monitor module to restrict access to a protected transfer buffer in a secure memory view using a hardware virtualization feature of a processor of the computing device; and an input module to (i) store, in the secure memory view, user input data generated by a user input device of the computing device into the protected transfer buffer and (ii) transfer, in response to storage of the user input data, the user input data from a kernel module to an authorized application via a protected side channel in the secure memory view.

Example 2 includes the subject matter of Example 1, and wherein to store the user input data generated by the user input device comprises to store touch input coordinates generated by a touch input controller of the computing device.

Example 3 includes the subject matter of any of Examples 1 and 2, and wherein to transfer the user input data from the kernel module to the authorized application comprises to transfer the user input data from a protected touch filter driver of the computing device to the authorized application.

Example 4 includes the subject matter of any of Examples 1-3, and wherein the input module is further to (i) intercept, by the protected filter driver, a request for user input and (ii) replace, by the protected filter driver, an unprotected transfer buffer of the request for user input with the protected transfer buffer in response to interception of the request for user input; wherein to store the user input data generated by the user input device of the computing device into the protected transfer buffer comprises to store the user input data in response to replacement of the unprotected transfer buffer with the protected transfer buffer.

Example 5 includes the subject matter of any of Examples 1-4, and wherein to store the user input data generated by the user input device into the protected transfer buffer comprises to perform a direct memory access operation by the user input device in the secure memory view using the hardware virtualization feature of the processor of the computing device.

Example 6 includes the subject matter of any of Examples 1-5, and wherein the security monitor module is further to (i) verify the kernel module and (ii) allow the kernel module to access the secure memory view in response to verification of the kernel module.

Example 7 includes the subject matter of any of Examples 1-6, and wherein the security monitor module is further to (i) verify the authorized application and (ii) allow the authorized application to access the secure memory view in response to verification of the authorized application.

Example 8 includes the subject matter of any of Examples 1-7, and wherein the security monitor module is further to generate a virtualization exception in response to an unauthorized access to the secure memory view.

Example 9 includes the subject matter of any of Examples 1-8, and further including an overlay rendering module to (i) render, in response to storage of the user input data, graphical feedback in a display overlay surface as a function of the user input data and (ii) display the display overlay surface and a primary application surface generated by the authorized application; wherein the security monitor module is further to restrict access to the display overlay surface in the secure memory view using the hardware virtualization feature of the processor of the computing device.

Example 10 includes the subject matter of any of Examples 1-9, and wherein the security monitor module is further to (i) verify the overlay rendering module and (ii) allow the overlay rendering module to access the secure memory view in response to verification of the overlay rendering module.

Example 11 includes the subject matter of any of Examples 1-10, and further including a virtual user interface module to (i) start a protected virtual user interface service in the secure memory view and (ii) render a virtual user interface in the display overlay surface as a function of the user input data.

Example 12 includes the subject matter of any of Examples 1-11, and wherein the virtual user interface comprises a virtual keyboard.

Example 13 includes the subject matter of any of Examples 1-12, and wherein to render the virtual user interface comprises to determine, by the protected virtual user interface service, a selected virtual input of the virtual user interface as a function of the user input data; and visually emphasize, by the protected virtual user interface service, the selected virtual input.

Example 14 includes the subject matter of any of Examples 1-13, and wherein the overlay rendering module is further to write the virtual user interface to the display overlay surface in the secure memory view, wherein the overlay rendering module is a protected component of a graphics driver of the computing device.

Example 15 includes the subject matter of any of Examples 1-14, and wherein the input module is further to transfer, in response to the storage of the user input data, the user input data from the kernel module to the protected virtual user interface service in the secure memory view; and to render the graphical feedback comprises to render the graphical feedback in response to a transfer of the user input data from the kernel module to the protected virtual user interface service.

Example 16 includes the subject matter of any of Examples 1-15, and wherein the security monitor module is further to (i) verify the protected virtual user interface service and (ii) allow the protected virtual user interface service to access the secure memory view in response to verification of the protected virtual user interface service.

Example 17 includes the subject matter of any of Examples 1-16, and wherein to restrict access to the protected transfer buffer in the secure memory view using the hardware virtualization feature of the processor comprises to establish the secure memory view using an extended page table of the computing device.

Example 18 includes a method for secure input, the method comprising restricting, by a computing device, access to a protected transfer buffer in a secure memory view using a hardware virtualization feature of a processor of the computing device; storing, by the computing device in the secure memory view, user input data generated by a user input device of the computing device into the protected transfer buffer; and transferring, by the computing device in response to storing the user input data, the user input data from a kernel module to an authorized application via a protected side channel in the secure memory view.

Example 19 includes the subject matter of Example 18, and wherein storing the user input data generated by the user input device comprises storing touch input coordinates generated by a touch input controller of the computing device.

Example 20 includes the subject matter of any of Examples 18 and 19, and wherein transferring the user input data from the kernel module to the authorized application comprises transferring the user input data from a protected touch filter driver of the computing device to the authorized application.

Example 21 includes the subject matter of any of Examples 18-20, and further including intercepting, by the protected filter driver, a request for user input; and replacing, by the protected filter driver, an unprotected transfer buffer of the request for user input with the protected transfer buffer in response to intercepting the request for user input; wherein storing the user input data generated by the user input device of the computing device into the protected transfer buffer comprises storing the user input data in response to replacing the unprotected transfer buffer with the protected transfer buffer.

Example 22 includes the subject matter of any of Examples 18-21, and wherein storing the user input data generated by the user input device into the protected transfer buffer comprises performing a direct memory access operation by the user input device in the secure memory view using the hardware virtualization feature of the processor of the computing device.

Example 23 includes the subject matter of any of Examples 18-22, and further including verifying, by the computing device, the kernel module; and allowing, by the computing device, the kernel module to access the secure memory view in response to verifying the kernel module.

Example 24 includes the subject matter of any of Examples 18-23, and further including verifying, by the computing device, the authorized application; and allowing, by the computing device, the authorized application to access the secure memory view in response to verifying the authorized application.

Example 25 includes the subject matter of any of Examples 18-24, and further including generating, by the computing device, a virtualization exception in response to an unauthorized access to the secure memory view.

Example 26 includes the subject matter of any of Examples 18-25, and further including restricting, by the computing device, access to a display overlay surface in the secure memory view using the hardware virtualization feature of the processor of the computing device; rendering, by the computing device in response to storing the user input data, graphical feedback in the display overlay surface as a function of the user input data; and displaying, by the computing device, the display overlay surface and a primary application surface generated by the authorized application.

Example 27 includes the subject matter of any of Examples 18-26, and further including starting, by the computing device, a protected virtual user interface service in the secure memory view; wherein rendering the graphical feedback in the display overlay surface comprises rendering, by the protected virtual user interface service, a virtual user interface as a function of the user input data.

Example 28 includes the subject matter of any of Examples 18-27, and wherein rendering the virtual user interface comprises rendering a virtual keyboard as a function of the user input data.

Example 29 includes the subject matter of any of Examples 18-28, and wherein rendering the virtual user interface comprises:

determining, by the protected virtual user interface service, a selected virtual input of the virtual user interface as a function of the user input data; and visually emphasizing, by the protected virtual user interface service, the selected virtual input.

Example 30 includes the subject matter of any of Examples 18-29, and wherein rendering the virtual keyboard comprises writing, by a protected component of a graphics driver of the computing device, the virtual user interface to the display overlay surface in the secure memory view.

Example 31 includes the subject matter of any of Examples 18-30, and further including verifying, by the computing device, the protected component of the graphics driver; and allowing, by the computing device, the protected component of the graphics driver to access the secure memory view in response to verifying the protected component of the graphics driver.

Example 32 includes the subject matter of any of Examples 18-31, and further including transferring, by the computing device in response to storing the user input data, the user input data from the kernel module to the protected virtual user interface service in the secure memory view; wherein rendering the graphical feedback comprises rendering the graphical feedback in response to transferring the user input data from the kernel module to the protected virtual user interface service.

Example 33 includes the subject matter of any of Examples 18-32, and further including verifying, by the computing device, the protected virtual user interface service; and allowing, by the computing device, the protected virtual user interface service to access the secure memory view in response to verifying the protected virtual user interface service.

Example 34 includes the subject matter of any of Examples 18-33, and wherein restricting access to the protected transfer buffer in the secure memory view using the hardware virtualization feature of the processor comprises establishing the secure memory view using an extended page table of the computing device.

Example 35 includes a computing device comprising a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for secure input, the computing device comprising means for restricting access to a protected transfer buffer in a secure memory view using a hardware virtualization feature of a processor of the computing device; means for storing, in the secure memory view, user input data generated by a user input device of the computing device into the protected transfer buffer; and means for transferring, in response to storing the user input data, the user input data from a kernel module to an authorized application via a protected side channel in the secure memory view.

Example 39 includes the subject matter of Example 38, and wherein the means for storing the user input data generated by the user input device comprises means for storing touch input coordinates generated by a touch input controller of the computing device.

Example 40 includes the subject matter of any of Examples 38 and 39, and wherein the means for transferring the user input data from the kernel module to the authorized application comprises means for transferring the user input data from a protected touch filter driver of the computing device to the authorized application.

Example 41 includes the subject matter of any of Examples 38-40, and further including means for intercepting, by the protected filter driver, a request for user input; and means for replacing, by the protected filter driver, an unprotected transfer buffer of the request for user input with the protected transfer buffer in response to intercepting the request for user input; wherein the means for storing the user input data generated by the user input device of the computing device into the protected transfer buffer comprises means for storing the user input data in response to replacing the unprotected transfer buffer with the protected transfer buffer.

Example 42 includes the subject matter of any of Examples 38-41, and wherein the means for storing the user input data generated by the user input device into the protected transfer buffer comprises means for performing a direct memory access operation by the user input device in the secure memory view using the hardware virtualization feature of the processor of the computing device.

Example 43 includes the subject matter of any of Examples 38-42, and further including means for verifying the kernel module; and means for allowing the kernel module to access the secure memory view in response to verifying the kernel module.

Example 44 includes the subject matter of any of Examples 38-43, and further including means for verifying the authorized application; and means for allowing the authorized application to access the secure memory view in response to verifying the authorized application.

Example 45 includes the subject matter of any of Examples 38-44, and further including means for generating a virtualization exception in response to an unauthorized access to the secure memory view.

Example 46 includes the subject matter of any of Examples 38-45, and further including means for restricting access to a display overlay surface in the secure memory view using the hardware virtualization feature of the processor of the computing device; means for rendering, in response to storing the user input data, graphical feedback in the display overlay surface as a function of the user input data; and means for displaying the display overlay surface and a primary application surface generated by the authorized application.

Example 47 includes the subject matter of any of Examples 38-46, and further including means for starting a protected virtual user interface service in the secure memory view; wherein the means for rendering the graphical feedback in the display overlay surface comprises means for rendering, by the protected virtual user interface service, a virtual user interface as a function of the user input data.

Example 48 includes the subject matter of any of Examples 38-47, and wherein the means for rendering the virtual user interface comprises means for rendering a virtual keyboard as a function of the user input data.

Example 49 includes the subject matter of any of Examples 38-48, and wherein the means for rendering the virtual user interface comprises means for determining, by the protected virtual user interface service, a selected virtual input of the virtual user interface as a function of the user input data; and means for visually emphasizing, by the protected virtual user interface service, the selected virtual input.

Example 50 includes the subject matter of any of Examples 38-49, and wherein the means for rendering the virtual keyboard comprises means for writing, by a protected component of a graphics driver of the computing device, the virtual user interface to the display overlay surface in the secure memory view.

Example 51 includes the subject matter of any of Examples 38-50, and further including means for verifying the protected component of the graphics driver; and means for allowing the protected component of the graphics driver to access the secure memory view in response to verifying the protected component of the graphics driver.

Example 52 includes the subject matter of any of Examples 38-51, and further including means for transferring, in response to storing the user input data, the user input data from the kernel module to the protected virtual user interface service in the secure memory view; wherein the means for rendering the graphical feedback comprises means for rendering the graphical feedback in response to transferring the user input data from the kernel module to the protected virtual user interface service.

Example 53 includes the subject matter of any of Examples 38-52, and further including means for verifying the protected virtual user interface service; and means for allowing the protected virtual user interface service to access the secure memory view in response to verifying the protected virtual user interface service.

Example 54 includes the subject matter of any of Examples 38-53, and wherein the means for restricting access to the protected transfer buffer in the secure memory view using the hardware virtualization feature of the processor comprises means for establishing the secure memory view using an extended page table of the computing device.

The invention claimed is:

1. A computing device for secure input, the computing device comprising:

a security monitor module to restrict access to a protected transfer buffer in a secure memory view using a hardware virtualization feature of a processor of the computing device; and an input module to (i) intercept, by a protected filter driver of the computing device, a request for user input, (ii) replace, by the protected filter driver, an unprotected transfer buffer of the request for user input with the protected transfer buffer in response to interception of the request for user input, (iii) store, in the secure memory view, user input data generated by a user input device of the computing device into the protected transfer buffer in response to replacement of the unprotected transfer buffer with the protected transfer buffer, and (iv) transfer, in response to storage of the user input data, the user input data from the protected filter driver to an authorized application via a protected side channel in the secure memory view.

2. The computing device of claim 1, wherein to store the user input data generated by the user input device into the protected transfer buffer comprises to perform a direct memory access operation by the user input device in the secure memory view using the hardware virtualization feature of the processor of the computing device.

3. The computing device of claim 1, wherein the security monitor module is further to (i) verify the kernel module and (ii) allow the kernel module to access the secure memory view in response to verification of the kernel module.

4. The computing device of claim 1, wherein the security monitor module is further to (i) verify the authorized application and (ii) allow the authorized application to access the secure memory view in response to verification of the authorized application.

5. The computing device of claim 1, further comprising:

an overlay rendering module to (i) render, in response to storage of the user input data, graphical feedback in a display overlay surface as a function of the user input data and (ii) display the display overlay surface and a primary application surface generated by the authorized application;

wherein the security monitor module is further to restrict access to the display overlay surface in the secure memory view using the hardware virtualization feature of the processor of the computing device.

6. The computing device of claim 5, wherein the security monitor module is further to (i) verify the overlay rendering module and (ii) allow the overlay rendering module to access the secure memory view in response to verification of the overlay rendering module.

7. The computing device of claim 5, further comprising:

a virtual user interface module to (i) start a protected virtual user interface service in the secure memory view and (ii) render a virtual user interface in the display overlay surface as a function of the user input data.

8. The computing device of claim 7, wherein the security monitor module is further to (i) verify the protected virtual user interface service and (ii) allow the protected virtual user interface service to access the secure memory view in response to verification of the protected virtual user interface service.

9. The computing device of claim 1, wherein to restrict access to the protected transfer buffer in the secure memory view using the hardware virtualization feature of the processor comprises to establish the secure memory view using an extended page table of the computing device.

10. A method for secure input, the method comprising:

restricting, by a computing device, access to a protected transfer buffer in a secure memory view using a hardware virtualization feature of a processor of the computing device;

intercepting, by a protected filter driver of the computing device, a request for user input;

replacing, by the protected filter driver, an unprotected transfer buffer of the request for user input with the protected transfer buffer in response to intercepting the request for user input;

storing, by the computing device in the secure memory view, user input data generated by a user input device of the computing device into the protected transfer buffer in response to replacing the unprotected transfer buffer with the protected transfer buffer; and transferring, by the computing device in response to storing the user input data, the user input data from the protected filter driver to an authorized application via a protected side channel in the secure memory view.

11. The method of claim 10, wherein storing the user input data generated by the user input device into the protected transfer buffer comprises performing a direct memory access operation by the user input device in the secure memory view using the hardware virtualization feature of the processor of the computing device.

12. The method of claim 10, further comprising:

restricting, by the computing device, access to a display overlay surface in the secure memory view using the hardware virtualization feature of the processor of the computing device;

rendering, by the computing device in response to storing the user input data, graphical feedback in the display overlay surface as a function of the user input data; and displaying, by the computing device, the display overlay surface and a primary application surface generated by the authorized application.

13. The method of claim 12, further comprising:

starting, by the computing device, a protected virtual user interface service in the secure memory view;

wherein rendering the graphical feedback in the display overlay surface comprises rendering, by the protected virtual user interface service, a virtual user interface as a function of the user input data.

14. One or more non-transitory computer-readable storage media comprising a plurality of instructions that in response to being executed cause a computing device to:

restrict access to a protected transfer buffer in a secure memory view using a hardware virtualization feature of a processor of the computing device;

intercept, by a protected filter driver of the computing device, a request for user input;

replace, by the protected filter driver, an unprotected transfer buffer of the request for user input with the protected transfer buffer in response to intercepting the request for user input;

store, in the secure memory view, user input data generated by a user input device of the computing device into the protected transfer buffer in response to replacing the unprotected transfer buffer with the protected transfer buffer; and transfer, in response to storing the user input data, the user input data from the protected filter driver to an authorized application via a protected side channel in the secure memory view.

15. The one or more non-transitory computer-readable storage media of claim 14, wherein to store the user input data generated by the user input device into the protected transfer buffer comprises to perform a direct memory access operation by the user input device in the secure memory view using the hardware virtualization feature of the processor of the computing device.

16. The one or more non-transitory computer-readable storage media of claim 14, further comprising a plurality of instructions that in response to being executed cause the computing device to:

restrict access to a display overlay surface in the secure memory view using the hardware virtualization feature of the processor of the computing device;

render, in response to storing the user input data, graphical feedback in the display overlay surface as a function of the user input data; and display the display overlay surface and a primary application surface generated by the authorized application.

17. The one or more non-transitory computer-readable storage media of claim 16, further comprising a plurality of instructions that in response to being executed cause the computing device to:

start a protected virtual user interface service in the secure memory view;

wherein to render the graphical feedback in the display overlay surface comprises to render, by the protected virtual user interface service, a virtual user interface as a function of the user input data.

* * * * *